United States Patent [19]
Ragály

[11] 4,153,869
[45] May 8, 1979

[54] DUAL VOLTAGE NETWORK ELECTRICAL POWER SUPPLY SYSTEM, PARTICULARLY FOR AUTOMOTIVE VEHICLES

[75] Inventor: Istvan Ragály, Schwieberdingen, Fed. Rep. of Germany

[73] Assignee: Robert Bosch GmbH, Stuttgart, Fed. Rep. of Germany

[21] Appl. No.: 838,635

[22] Filed: Oct. 3, 1977

[30] Foreign Application Priority Data

Nov. 6, 1976 [DE] Fed. Rep. of Germany ....... 2650851

[51] Int. Cl.² .............................................. H02J 7/14
[52] U.S. Cl. ...................................... 322/90; 322/93; 320/6; 320/17
[58] Field of Search ........................... 320/6, 7, 15–17; 322/29, 89, 90, 91, 86

[56] References Cited

U.S. PATENT DOCUMENTS

| | | | |
|---|---|---|---|
| 3,400,318 | 9/1968 | Hill | 322/29 X |
| 3,809,995 | 5/1974 | Hardin | 322/90 X |
| 3,922,592 | 11/1975 | Quantz | 322/90 X |
| 4,045,718 | 8/1977 | Gray | 322/90 X |

Primary Examiner—Robert J. Hickey
Attorney, Agent, or Firm—Frishauf, Holtz, Goodman & Woodward

[57] ABSTRACT

A three-phase alternator has tapped armature windings, the tap points being connected to provide 12 V output and to a main battery. The end terminals of the armature windings are connected to an auxiliary rectifier, the output of which is connected to an auxiliary battery which is serially connected to the main battery, so that the two batteries are serially connected like the serial connection of the armature winding portions. A single voltage regulator, which may be connected to the auxiliary rectifier, or can be separately supplied by separately rectified current controls current flow through the field. The voltage regulator can be connected to the end terminals of the armature windings so that the field will be energized at the higher voltage level corresponding to the series voltages of both batteries, and permitting use of the auxiliary rectifier also as a field rectifier. A typical high voltage load in an automotive vehicle is the starter, used only intermittently and for short periods, but at high power levels.

12 Claims, 3 Drawing Figures

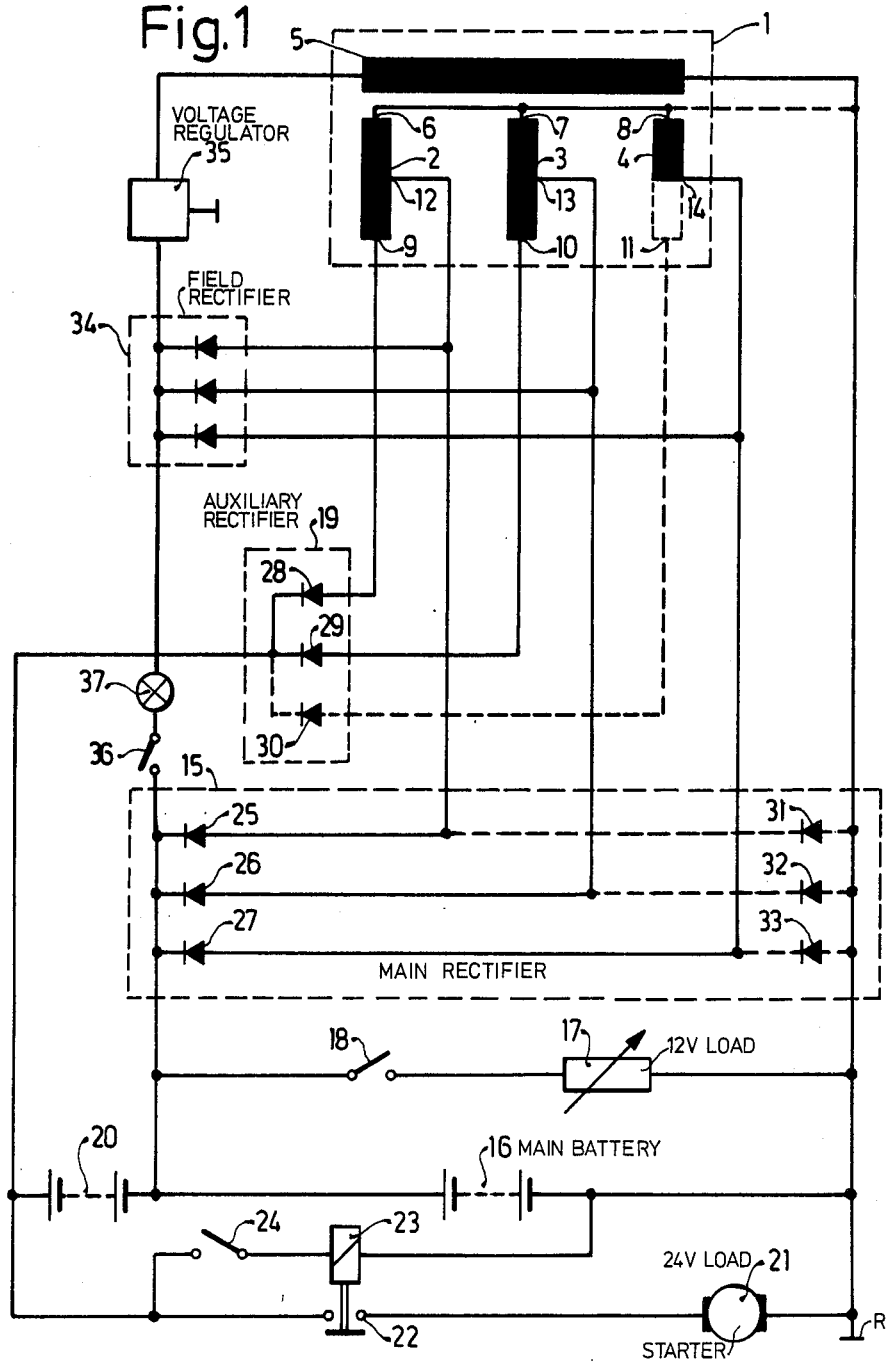

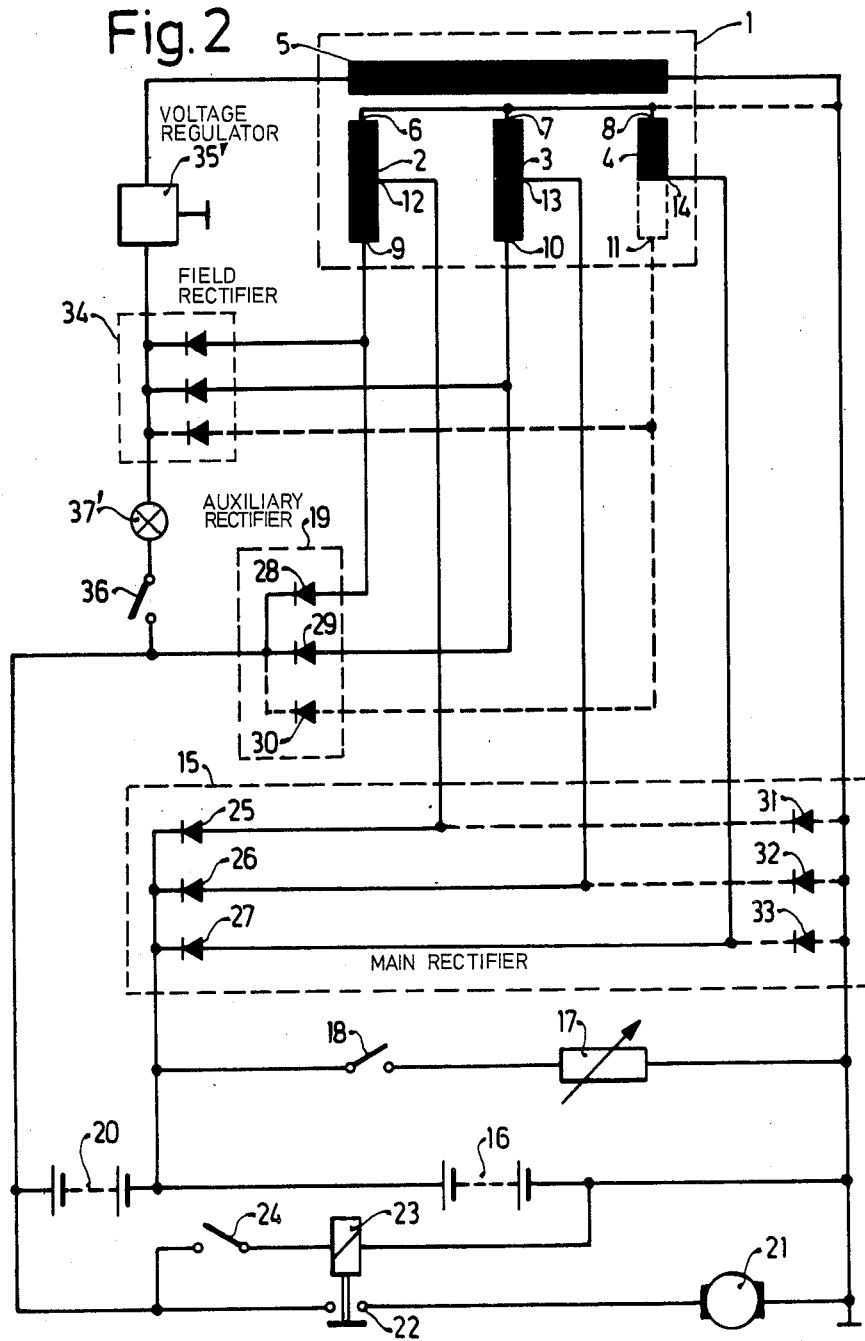

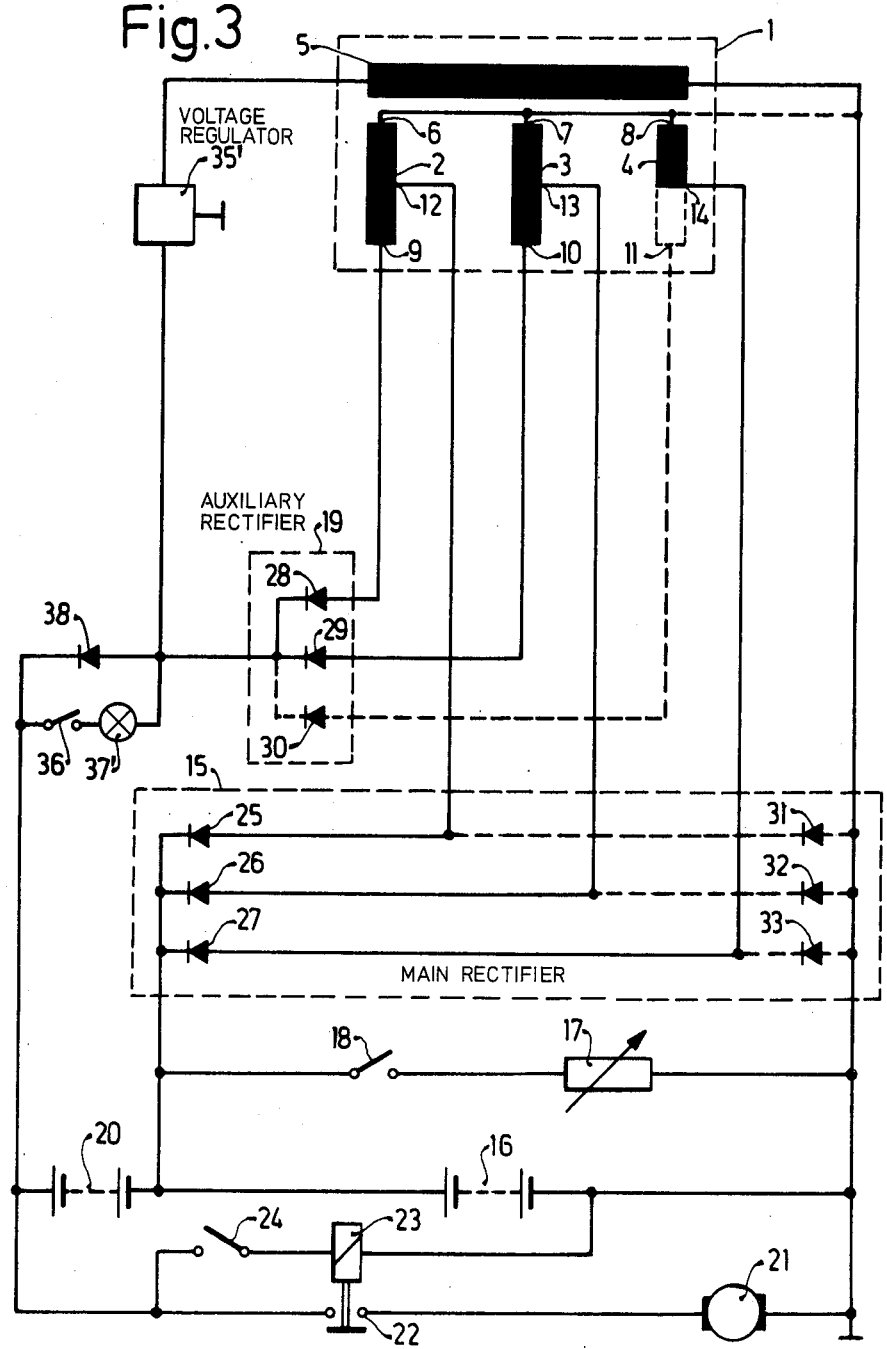

DUAL VOLTAGE NETWORK ELECTRICAL POWER SUPPLY SYSTEM, PARTICULARLY FOR AUTOMOTIVE VEHICLES

Cross reference to related applications assigned to the assignee of the present invention:

U.S. Ser. No. 751,438, filed Dec. 16, 1976, PFEFFER ET AL; now U.S. Pat. No. 4,100,474 dated July 11, 1978;

U.S. Ser. No. 831,664, filed Sept. 8, 1977, KOFINK;

U.S. Ser. No. 838,636, Oct. 3, 1977, RAGALY.

The present invention relates to a dual voltage vehicular network arrangement to supply electrical energy to the on-board electrical system of a vehicle, typically an automotive vehicle, and more particularly to such a system and arrangement in which a main voltage supply is provided at a first voltage level, for example 12 V, supplied through a rectifier from a three-phase alternator, and an auxiliary voltage supply is provided at a higher voltage, for example 24 V.

BACKGROUND AND PRIOR ART

Various types of multi-voltage level on-board systems have been proposed. Typically, the voltages can be 12 volts and 24 volts. The 12 volt system is used, in well known manner, to supply the usual load encountered in the vehicle such as headlights, signalling lights, radios and the like. The 24 volt system is particularly adapted to supply power to high power loads, such the starter of the vehicle. The high power users require higher operating currents if the battery voltage drops. High currents cause numerous problems, such as heating of electrical supply lines, high resistance contacts or terminals, and the like. Raising the overall on-board voltage for all loads is not necessarily desirable, however, since the lifetime of many loads decreases with increasing voltage—for example incandescent lamps—and problems with insulation arise, particularly in the presence of moisture. To match the voltage level to the various loads for optimum performance, it has previously been proposed to provide multi-voltage circuits in the on-board network of the vehicle. The normal, usually supplied battery supplies the customary and usual and connected loads of the vehicle. The second battery is added only when loads requiring high power are to be connected. The starter is then supplied from both the main battery and an auxiliary battery, connected in series. This system has difficulties, however, since switch-over of the batteries is required in dependence on the operating system and network of the vehicle. Separate switch-over circuits are needed in order to permit charging of both batteries by the alternator of the vehicle. Normally, the alternators are designed to provide output power only at a single voltage level. Under ordinary operation of the vehicle, a single battery is sufficient. The second series connected battery which is usually used only upon starting of the vehicle is not loaded or needed in normal operation. As far as the charging circuit of the battery system, then, is concerned, the second battery requires charging at a much lesser level, and with much lesser energy and at a lower power level than charging of the main battery.

The textbook by Kirdorf, "Praxis der Autoelektrik, Vol IV, Page 195, (1970), " describes a circuit in which two batteries are switched by a battery transfer switch. This system has the disadvantage that a high voltage transfer switch is necessary in order to connect the batteries in accordance with the operating mode of the vehicle. Such transfer or change-over switches are subject to malfunction and expensive. It has also been proposed to generate a second, higher voltage from the rectified voltage of an alternator of a vehicle by using a voltage doubling circuit. Such a circuit—known as such—can be used since the additional or auxiliary battery requires only a relatively low charging current. Electronic voltage doubling circuits have the disadvantage, however, that they require modification of the three phase rectifier used with the alternator and that the circuit is comparatively complex and hence expensive.

THE INVENTION

It is an object to provide a dual voltage electrical supply arrangement or system which permits use of devices and components which are standard in the industry with as little modification as possible and not requiring specific structural elements or systems to be able to install a dual voltage arrangement in a vehicle.

Briefly, a main battery and an auxiliary battery are provided, serially connected together. An alternator, typically a three-phase alternator, supplies the main battery with rectified current through a main rectifier. An auxiliary rectifier is provided, connected to the end terminals of the armature windings of the alternator, the main rectifier being connected to tap points brought out from the windings of the alternator so that voltages at two voltage levels will be available to supply the serially connected main and auxiliary batteries and, separately, the main battery.

In accordance with a feature of the invention, the field winding of the alternator is supplied through a rectifier from the output voltage of the alternator which can be selectively connected to either the taps or to the end terminals of the armature to thereby supply, selectively, higher or lesser field energy to the alternator.

In a preferred form, the auxiliary rectifier to supply the second, and higher charge voltage for the auxiliary battery, is a modified bridge circuit, since the loading placed on the auxiliary rectifier is low, the auxiliary battery requiring only little charge current. It is possible in many applications to charge the auxiliary battery only over two phases of a three-phase alternator, using only two diodes.

If this arrangement is used, the third armature winding need not be tapped, but only that portion of the armature need be wound which corresponds to the portion of the other phases which extend to the tap point. This results in additional savings in construction and in wiring, particularly since the diodes required to rectify the alternator output to charge the auxiliary battery can be of low current carrying capacity with respect to the power rating of the diodes to charge the main battery.

The field winding of the alternator is usually supplied through a rectifier which is connected to the higher one of the output voltages from the armature. This provides a better flux distribution of the alternator with the same volume of field winding. The charge current to charge the auxiliary battery can be derived from the same rectifier which also supplies the alternator field, thus additionally saving in components since a separate high voltage rectifier is not needed, the rectifier being provided for the field additionally being used to charge the auxiliary battery.

Drawings, illustrating an example:

FIG. 1 is a highly schematic circuit diagram of the multi-voltage system;

FIG. 2 is a schematic diagram showing a modification; and

FIG. 3 is a schematic diagram showing another modification.

A three-phase alternator 1 has a field 5 and three armature coils 2, 3, 4. The armature coils or windings 2, 3, 4 are star-connected, which, in effect, means that the terminals 6, 7, 8 thereof are connected together. The armature windings 2, 3, 4 have tap points 12, 13, 14 brought out.

A main rectifier 15 is connected to tap points 12, 13, 14 of the armature windings 2, 3, 4. A main battery 16 is connected to the d-c output of the main rectifier 15. This, in an automotive vehicle, would usually be the main battery of the vehicle providing, for example, 12 V output. The 12 volt energy can be connected through a switch 18 to a load 17 which is shown as a variable load and, for example, includes lights, heater motors, communication equipment, and the like, of the vehicle.

The end terminals 9, 10, 11 of the armature windings 2, 3, 4 are connected to a second three-phase bridge rectifier 19, the cathode of which is connected to the positive terminal of an auxiliary battery 20, serially connected with the main battery 16. An auxiliary load 21, typically the starter motor for the engine of the vehicle, can be connected across the series connection of batteries 16, 20 over the relay contacts 22 of a starter relay having a winding 23 which can be energized by switch 24. As shown, switch 24 is connected across both batteries, thus, would have to be insulated for 24 V and the solenoid coil 23 of the relay would have to be wound for that voltage. The switch 24 could also be connected to the junction of the batteries 20, 16, in which case the relay coil 23 can be wound for 12 volts.

The taps 12, 13, 14 of armature windings 2, 3, 4 are connected to a third three-phase rectifier 34 which provides rectified current for field winding 5 of the alternator 1. The field rectifier 34 has its cathode connected to a voltage regulator 35 for control of current flow through field winding 5 and, further, through a charge control lamp 37 and a switch 36, which may form part of the ignition switch or main ON-OFF switch of the vehicle to the d-c output terminals of the main rectifier 15, and hence the cross battery 16.

The armature windings 2, 3, 4 of alternator 1 are so arranged that the voltage from the end terminals 9, 10, 11 thereof is suitable to charge the series connection of both batteries 16, 20 when rectified. The voltage at the tap points 12, 13, 14 is so selected that, after rectification, it is suitable to charge battery 16 and to supply the loads 17. Thus, the armature windings which are formed with the taps can be arranged for a dual voltage system to provide the requisite d-c output voltage suitable for use in the vehicle, for example 12 volts and 24 volts. In ordinary, normal operation, the main battery 16 is supplied from the alternator, to supply the normal loads 17. If, for predetermined periods of time, a second load 21 is needed which, typically, is the starter, or any other load requiring high power, then the second or auxiliary load 22 is connected through relay 23 to the series circuit of the main battery 16 and the second battery 20 for the short period of time that it is placed in operation. The first, or main battery 16 can then continue to supply the main load 17, and the second auxiliary battery 20 can be re-charged to supply the additional energy thereto which was taken out of the battery during the short-time interval that the auxiliary load 21 was connected thereto. Consequently, the charging circuit for the auxiliary battery 20 can be dimensioned to a much lower power loading than that of the main charging circuit including the main rectifier 15.

In a preferred embodiment, the auxiliary three-phase rectifier 19 and including the rectifying diodes 28, 29, 30 can be constructed merely as a two-phase rectifier using only diodes 28, 29, with diode 30, shown in broken-line connection, being omitted. The two diodes 28, 29 are then connected to the terminals 9, 10 of the armature windings 2, 3 only. The armature winding 4 then need be constructed only to have the number of windings which go to the tap point 14—see FIG. 1.

It is not strictly necessary that main rectifier 15 include six diodes. A half-wave rectification is also suitable and, thus, the diodes 31, 32, 33 could be omitted. For this reason, their connection has been shown in broken lines. If this connection is selected, the star point of the windings 2, 3, 4 of the armature of the alternator are then connected to the ground or reference bus R, as shown by the broken line from the common terminals 6, 7, 8 thereto.

The field 5 is energized, as well known, over a separate field rectifier 34 which is connected to the tap terminals 12, 13, 14 of the armature windings 2, 3, 4. The d-c output voltage from the field rectifier 34 is connected through a well known voltage regulator 35 to control current flow through the field winding 5; additionally, it is connected through a charge control lamp 37 and a main switch 36, which may be part of the ignition or main switch of the motor vehicle to the positive terminal of the main battery 16.

Embodiment of FIG. 2: In contrast to the embodiment of FIG. 1, the field rectifier 34 is connected to the high-voltage terminals 9, 10, 11 of the alternator armature windings 2, 3, 4. The d-c output of the field rectifier 34 is connected to the voltage regulator 35' and through charge control lamp 37' to the main switch 36 which, then, is connected to the positive terminal of the battery 20. This provides for higher voltage in the field circuit of the alternator, and hence a higher voltage to the field winding 5 thereof. This is particularly advantageous since the volume of the alternator can be decreased with the same flux or, given a certain volume of the alternator, a higher magnetic force can be obtained, and a higher flux density therein. The voltage regulator 35' and indicator 37, of course, must be dimensioned for the higher voltage. As in the embodiment of FIG. 1, the rectifier diodes 31, 32, 33 can be omitted and, likewise, the field rectifier can be operated as a two-phase rectifier if the third armature winding 4 is carried out only to the tap point, also permitting elimination of the rectifier diode 30 of the auxiliary rectifier 19.

Embodiment of FIG. 3: The cathodes of the auxiliary rectifier 19 are connected to the voltage regulator 35. A diode 38 connects the positive terminal 20 to the output of the auxiliary rectifier 19 and to the voltage regulator 35. The diode is shunted by the series circuit formed of charge control lamp 37' and switch 36.

The field 5 is energized by the higher voltage derived from the series circuit of the battery 20 and the main battery 16. The second or auxiliary rectifier 19 provides charge current not only to the battery 20, but also the excitation current for the field 5. Thus, the field rectifiers 34 can be saved. Diode 38 provides for illumination of lamp 37' only when the battery 20 is discharging upon closing of switch 36, with the alternator stopped, to pre-energize field 5, the diode short-circuiting lamp 37' when the alternator provides output for self-excitation of the field 5.

Various changes and modifications may be made, and features described in connection with any one of the embodiments may be used with any of the others, within the scope of the inventive concept. Specifically, the changes discussed in connection with the main rectifier 15 and the auxiliary rectifier 19, by selective connection of diodes 31, 32, 33; and diode 30 can be used as desired and appropriate.

I claim:

1. Dual voltage vehicular network electric power supply system having
    an alternator (1) having a field (5) and armature windings (2, 3, 4)
    a main battery (16);
    an auxiliary battery (20) serially connected with the main battery;
    and a main rectifier (15),
    and comprising an auxiliary rectifier (19);
    taps (12, 13, 14) connected to the armature windings (2, 3, 4) of the alternator (1);
    and wherein the main rectifier (15) is connected to said tap points (12, 13, 14) of the alternator (1) and to charge said main battery, and the auxiliary rectifier is connected to the end terminals (9, 10, 11) of the armature windings (2, 3, 4) of the alternator (1) and to charge said auxiliary battery.

2. System according to claim 1, wherein the auxiliary rectifier (19) includes at least two diodes (28, 30), the anodes of which are connected to the end terminals (9, 10, 11) of the armature windings (2, 3, 4) of the alternator, and means connecting the cathodes thereof to the positive terminal of the auxiliary battery (20).

3. System according to claim 2, further including means (18) connecting a load (17) having a voltage rating matched to that of said main battery (16) across said main battery.

4. System according to claim 3, further including a higher voltage load (21) having a voltage rating matched to that of the series connection of both said main battery and said auxiliary battery, and means (22, 23, 24) connecting said higher voltage load across said series connection.

5. System according to claim 1, wherein the armature windings (2, 3, 4) are star connected, the star point forming the negative terminal of said network; and wherein the main rectifier (15) is a half-wave rectifier, the tap points (12, 13, 14) of said windings (2, 3, 4) being connected to the input to said rectifier, the output thereof forming the low-voltage d-c terminal of said network.

6. System according to claim 1, wherein the alternator (1) is a three-phase alternator;
    and the auxiliary rectifier comprises two diodes (28, 29) connected to two phases of said alternator.

7. System according to claim 6, wherein the armature windings (2, 3) of two phases have said tap points, connected to the main rectifier, the end terminals (9, 10) of said phases being connected to said two diodes, respectively, of the auxiliary rectifier;
    and the third phase winding (4) of the alternator (1) comprises a coil corresponding to the portion of the windings of said other two phases only up to said tap point.

8. System according to claim 1, further including a third rectifier (34) connected to the tap points (12, 13, 14) of the armature windings (2, 3, 4);
    a voltage regulator (35) connected to the field (5) of the alternator (1), and a charge control lamp (37) and a switch (36) in series therewith, connected to the positive terminal of the main battery (16).

9. System according to claim 1, further comprising (FIG. 2) a third rectifier (34) connected to the end terminals (9, 10, 11) of the armature windings (2, 3, 4) of the alternator (1);
    a voltage regulator (35) connecting the output of said third rectifier (34) and the field (5) of said alternator;
    and a charge control indicator lamp (37') and a switch (36) in series therewith, and connected to the positive terminal of the auxiliary battery (20), whereby the field (5) of the alternator will be energized by a voltage having a level corresponding to that of the combined, series connected main and auxiliary batteries (16, 20).

10. System according to claim 1, further comprising (FIG. 3) a voltage regulator (35') having its input connected to the output of the auxiliary rectifier (19), and having its output connected to the field (5) of the alternator (1), whereby the field of the alternator will be energized at a voltage level corresponding to the combined voltages of said series connected main and auxiliary batteries (16, 20).

11. System according to claim 10, further including a charge control indicator lamp (37') and a switch (36) in series therewith connecting the output of the auxiliary rectifier (19) to the positive terminal of the auxiliary battery (20);
    and a diode (38) bridging said charge control lamp (37).

12. System according to claim 1, wherein the vehicle is an automotive vehicle having an internal combustion engine and a starter, and wherein the starter (21) forms a high-voltage load, and means (22, 23, 24) connecting the starter (21) across the series connection of both said main and auxiliary batteries (16, 20).

* * * * *